United States Patent
Nouvel

[15] 3,694,511
[45] Sept. 26, 1972

[54] PROCESS FOR THE HYDROGENATION OF CYCLOALKANE HYDROPEROXIDES

[72] Inventor: Jacques Nouvel, Lyon, France
[73] Assignee: Rhone-Poulenc S.A., Paris, France
[22] Filed: Nov. 20, 1969
[21] Appl. No.: 878,543

[30] Foreign Application Priority Data

Nov. 21, 1968   France...................68174736

[52] U.S. Cl............260/586 R, 252/459, 260/631 R, 260/617 C
[51] Int. Cl.........................C07c 29/00, C07c 45/00
[58] Field of Search............260/586 R, 586 B, 631 R

[56] References Cited

UNITED STATES PATENTS 2,497,349   2/1950   Farkas et al............260/631 R
2,851,496   9/1958   Cates et al..........260/586 B X

FOREIGN PATENTS OR APPLICATIONS 1,505,363   11/1967   France...................260/586 R Primary Examiner—Leon Zitver
Assistant Examiner—Norman Morgenstern
Attorney—Stevens, Davis, Miller & Mosher

[57] ABSTRACT

Cycloalkane hydroperoxides are hydrogenated so that it is possible to avoid the disappearance of group VIII metal catalyst and to maintain the catalyst activity practically indefinitely by periodically rearranging the catalyst bed to transfer zones of low catalyst concentration to the later contacted parts of the catalyst bed.

7 Claims, No Drawings

PROCESS FOR THE HYDROGENATION OF CYCLOALKANE HYDROPEROXIDES

The present invention relates to the catalytic hydrogenation of cycloalkane hydroperoxides.

According to French Pat. specification No. 1,505,363 the hydrogenation of cycloalkane hydroperoxides can be effected in a reactor containing a catalyst consisting of palladium deposited on an inert support by a continuous trickling technique. However, it is found after about 5,000 hours' running that the catalyst has lost part of its activity and that it has become depleted in palladium. To continue the quantitative conversion of the hydroperoxides into a mixture of cycloalkanol and cycloalkanone it is necessary to introduce a fresh catalyst into the reactor. The same Patent also discloses that catalyst based on rhodium, rhenium or nickel can be used to hydrogenate the hydroperoxides.

This phenomenon of wearing-out of the catalyst is not limited to the use of palladium, but is found with all catalysts for the hydrogenation of hydroperoxides consisting of a group VIII metal deposited on an inert support.

The present invention provides a process for the catalytic hydrogenation of cycloalkane hydroperoxide in which it is possible to avoid the disappearance of the metal responsible for the catalytic activity and as a result the catalytic activity is maintained practically indefinitely.

Accordingly the present invention provides a process for continuously hydrogenating a cycloalkane hydroperoxide which comprises (1) contacting a mixture of hydrogen and a solution of cycloalkane hydroperoxide in cycloalkane with a group VIII metal catalyst deposited on an inert support, the said metal being distributed on the support such that the solution first contacts a first part of the support carrying sufficient catalyst to permit substantially complete hydrogenation of the hydroperoxide and that the hydrogenated solution then contacts a second part of the support carrying no catalyst or less catalyst than is required for substantially complete hydrogenation of the hydroperoxide; (2) continuing the contacting until the amount of the catalyst on the second part of the support has risen and the amount of catalyst on the first part of the support has fallen to below that required to permit substantially complete hydrogenation of the hydroperoxide; and (3) rearranging the support with the metal thereon so that the hydroperoxide solution again first contacts a first part of the support carrying sufficient catalyst to permit substantially complete hydrogenation of the hydroperoxide and the hydrogenated solution then contacts a second part of the support carrying no catalyst or less catalyst than is required for substantially complete hydrogenation of the hydroperoxide.

For example, the cycloalkane solution may be initially contacted with a catalyst bed comprising a deposit of a group VIII metal catalyst on an inert support at a catalyst concentration which permits substantially complete hydrogenation of the hydroperoxide and then with another bed comprising an inert support carrying no catalyst or a smaller concentration of the catalyst than the catalyst bed and, when the regions of the catalyst bed first contacted have become substantially depleted in catalyst, the beds are rearranged.

The description of the invention which follows refers to catalysts based on palladium, but the invention is not limited to palladium-based catalysts but is also applicable to all catalysts comprising a group VIII metal deposited on an inert support.

In the process of the invention the solutions of cycloalkane hydroperoxides initially pass through the catalyst beds in the reactor and then through a supplementary bed consisting of a support which does not contain palladium or is severely depleted in palladium, and the various beds of the reactor are changed around when the first catalyst beds have become severely depleted in palladium. It is surprisingly found that palladium removed from the catalyst is redeposited on the support containing little or no palladium. Thus by changing the beds round it is possible to place a bed charged with palladium at the reactor inlet.

The catalyst used in the process of the invention may contain varying amounts of active metal. Generally an initial catalyst content of 500 ppm is used and found to be very suitable. The catalyst may be obtained by any known process; for example if the active metal is palladium the deposition may be effected by impregnating the support with a solution of palladium chloride which is then reduced with hydrogen.

According to one embodiment of the process of the invention, the hydrogenation reaction is started by introducing a fresh catalyst into the reactor, followed by a quantity of the support not containing palladium. The catalyst is placed at the inlet for the reactants and the support which is not charged with active metal is placed at the outlet of the reactor.

After several thousand hours' operation, the distribution of the palladium is such that there is a maximum concentration of it at the center of the reactor, i.e., the bed initially devoid of palladium is enriched in the metal. The catalyst is then changed round either by dividing the reactor into various zones of equal capacity containing the same amount of the material constituted by support and active metal or by dividing the reactor into various zones taking the distribution of the palladium into account.

When the reactor is divided into zones or beds of equal capacity it is for example possible to use a reactor with three zones. The two first zones, 1 and 2, initially having a catalyst concentration of 500 ppm and the third, 3, having a catalyst concentration of 0 ppm, and to carry out a cyclical change-around which consists in placing bed No. 2, which is richest in palladium, at the reactor inlet and putting the beds in the order 2, 3, 1. There is then generally a minimum concentration of palladium near the beginning of the last catalyst bed. When the hydrogenation is continued after the change-round of the beds, it is found that this minimum gradually becomes less marked while the concentration of catalyst in the bed at the reactor inlet becomes less. When the bed at the reactor inlet becomes exhausted, another cyclical change-round is made.

It is also possible to change round zones of the reactor chosen taking into accound the distribution of the palladium. From the reactor inlet to the reactor outlet these zones may be distributed as follows:

| Zones | Palladium content in ppm |
|---|---|
| 1 | 0 – 200 |
| 2 | 200 – 400 |
| 3 | > 400 |

| 4 | 400 – 200 |
| 5 | 200 – 0 |

The relative importance of each zone depends on numerous factors, in particular on the initial palladium content, the duration and conditions of operation, as well as on the ratio of the initial amount of catalyst to the amount of support bearing no palladium. Generally, an amount of non-charged support used is from one-fourth to one-third of the total charge. An excess of non-charged support reaches the productivity while a deficit of non-charged support would necessitate more frequent changing of the beds.

The continuous operation and the migration of the palladium do not cause any loss of catalyst while the content of zone 5 is less than 200 ppm. Nevertheless the beds are changed round when the content of zone No. 5 is between 100 and 200 ppm. It is found that at that point zone No. 1 is severely depleted. In this change-round, the poorest catalytic zones are arranged close to the reactor outlet whilst either the zones richest in catalyst or the zones of medium catalyst content can be placed at the head of the reactor. It is for example possible to change the catalyst zones round in accordance with various combinations given below. The numbers indicate the place occupied by the catalyst zones immediately before each change-round.

2, 4, 3, 5, 1

4, 2, 3, 5, 1

2, 3, 4, 5, 1

3, 4, 2, 5, 1

Such change-rounds carried out after several thousand hours' running time can be repeated without either a lowering of catalytic activity or a disappearance of the palladium being observed.

The following example illustrates the invention.

EXAMPLE

Cyclohexyl hydroperoxide stocks are hydrogenated by the method described in French Pat. specification No. 1,505,363 in a cylindrical column 66 mm in diameter consisting of three sections 1 m high. Each section is separated from the preceding section by a distributor plate. 2.72 kg of a catalyst containing 500 ppm of palladium deposited on a support are placed in each of the two upper sections. The support consisting of electrolytic porcelain agglomerated with a ceramic glass, has a density of 0.8 and is in the form of irregular granules 5 to 8 mm. 2.72 kg of support not containing palladium are placed in the lower section.

Water at the rate of 1.1 kg/hour and cyclohexyl hydroperoxide in cyclohexane, containing about 11 percent of peroxide, at the rate of 11.2 kg/hour are simultaneously injected at the top of the reactor. The reactor is heated to an average temperature of 110°C. and kept under a constant hydrogen pressure (10 bars). At the reactor outlet the hydroperoxides have been totally hydrogenated. Samples of catalysts taken during continuous operation show the migration of the palladium and its progressive deposition on the bed initially devoid of palladium. After 2,250 hours the beds of the reactor are changed round, adopting the arrangement 2, 3, 1. Thus the excellent catalytic activity is maintained. The experiment is continued for a further 1,750 hours. At the end of the experiment the lowest bed has become charged with palladium and the minimum concentration of active metal at the start of this bed has become less marked. The palladium content of the catalyst beds during operation is shown in the table below:

| Length of life of the catalyst, hours | Palladium content in p.p.m. | | | | | | | | |
| --- | --- | --- | --- | --- | --- | --- | --- | --- | --- |
|  | First bed | | | Second bed | | | Third bed | | |
|  | 1st third | 2nd third | 3rd third | 1st third | 2nd third | 3rd third | 1st third | 2nd third | 3rd third |
| 0 | 500 | 500 | 500 | 500 | 500 | 500 | 0 | 0 | 0 |
| 390 | 237 | 450 | 630 | 500 | 490 | 380 | 50 | 50 | 0 |
| 1,535 | 100 |  | 370 | 680 | 560 | 545 | 170 | 110 | <50 |
| 2,250 | <50 | 110 | 280 | 515 | 645 | 605 | 275 | 170 | 110 |
| The beds are now changed round and placed in the order 2, 3, 1 | | | | | | | | | |
| 2,250 | 515 | 645 | 605 | 275 | 170 | 110 | <50 | 110 | 280 |
| 2,850 | 350 | 535 | 570 | 460 | 310 | 130 | 60 | 110 | 280 |
| 4,000 | <50 | 200 | 460 | 400 | 380 | 280 | 250 | 280 | 280 |

The hydrogenation can be continued by carrying out a fresh change-round.

I claim:

1. A process for continuously hydrogenating a cycloalkane hydroperoxide which comprises (1) contacting a mixture of hydrogen and a solution of cycloalkane hydroperoxide in cycloalkane with a group VIII metal catalyst deposited on an inert support, the said metal being distributed on the support such that the solution first contacts a first part of the support carrying sufficient catalyst to permit substantially complete hydrogenation of the hydroperoxide and that the hydrogenated solution then contacts a second part of the support carrying no catalyst or less catalyst than is required for substantially complete hydrogenation of the hydroperoxide; (2) continuing the contacting until the amount of the catalyst on the second part of the support has risen and the amount of catalyst on the first part of the support has fallen to below that required to permit substantially complete hydrogenation of the hydroperoxide; and (3) rearranging the support with metal thereon so that the hydroperoxide solution again first contacts a first part of the support carrying sufficient catalyst to permit substantially complete hydrogenation of the hydroperoxide and the hydrogenated solution then contacts a second part of the support carrying no catalyst or less catalyst than is required for substantially complete hydrogenation of the hydroperoxide.

2. A process according to claim 1 wherein the cycloalkane hydroperoxide solution is initially contacted with a catalyst bed comprising a deposit of a group VIII metal catalyst on an inert support at a catalyst concentration which permits substantially complete hydrogenation of the hydroperoxide and then with another bed comprising an inert support carrying no catalyst or a smaller concentration of the catalyst than the catalyst bed, and, when the regions of the catalyst bed first contacted have become substantially depleted in catalyst, rearranging the beds.

3. A process according to claim 1 wherein the first part of the support initially carries 500 ppm or group VIII metal.

4. A process according to claim 1 wherein the group VIII metal is palladium.

5. A process according to claim 4 wherein the palladium is initially deposited on the support by impregnating said support with palladium chloride which is then reduced with hydrogen.

6. A process according to claim 1 wherein the cycloalkane hydroperoxide is cyclohexane hydroperoxide.

7. A process according to claim 1 wherein the inert support is electrolytic porcelain agglomerated with ceramic glass.

* * * * *